F. J. PLUMMER.
CAR FENDER.
APPLICATION FILED MAY 26, 1916.
1,212,103.
Patented Jan. 9, 1917.
2 SHEETS—SHEET 2.
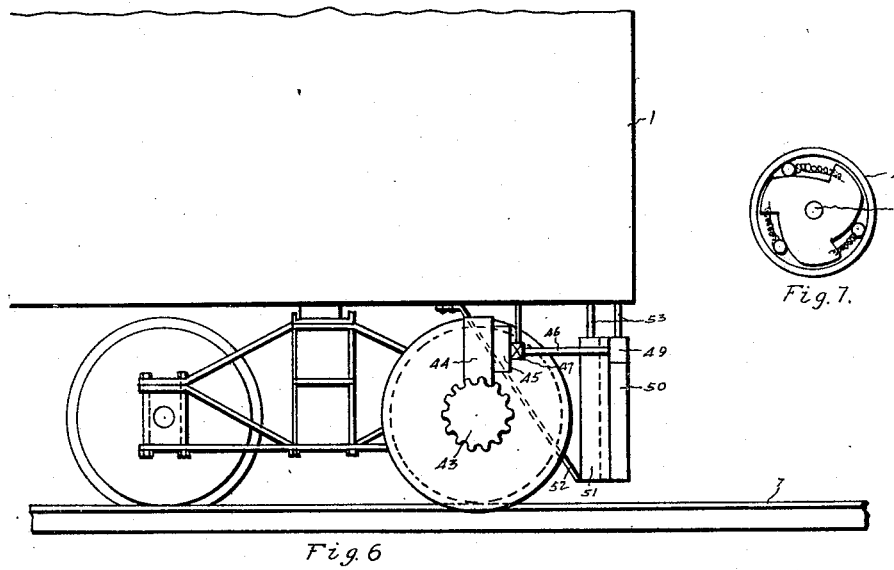
Fig. 6.
Fig. 7.
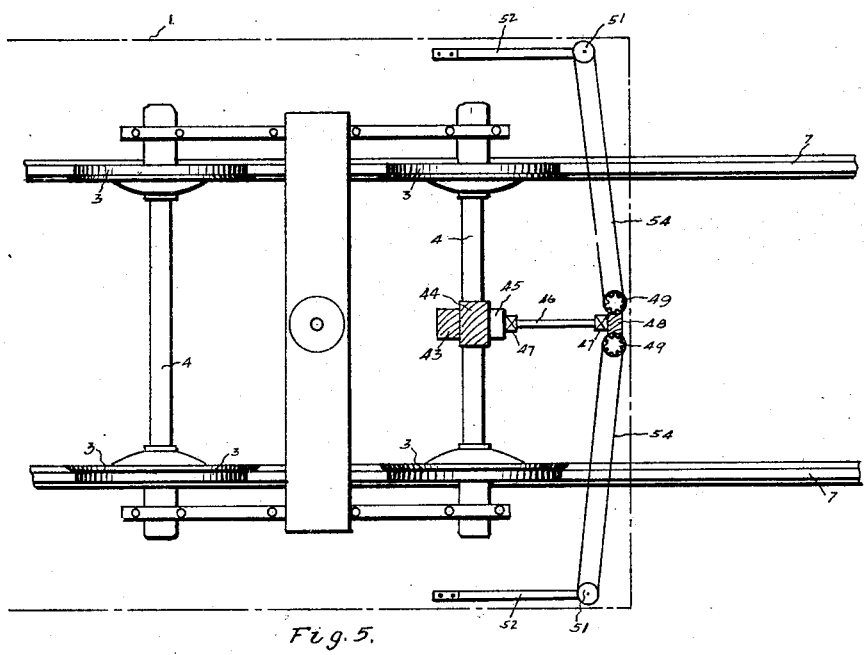
Fig. 5.
Inventor.
Francis J. Plummer

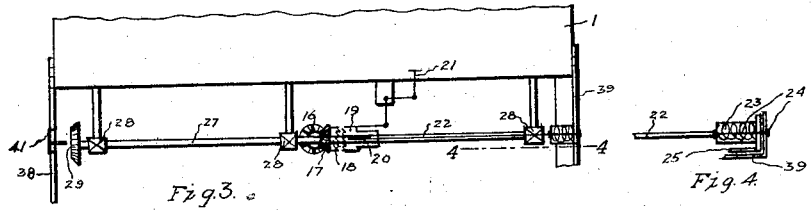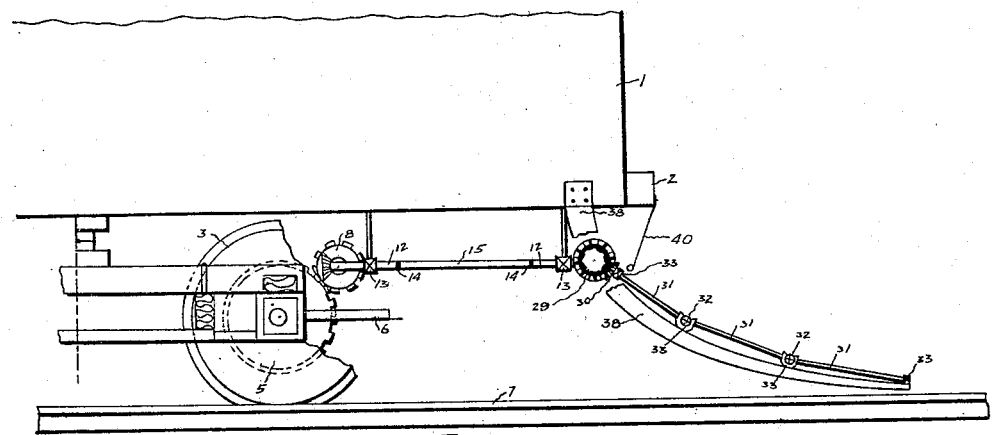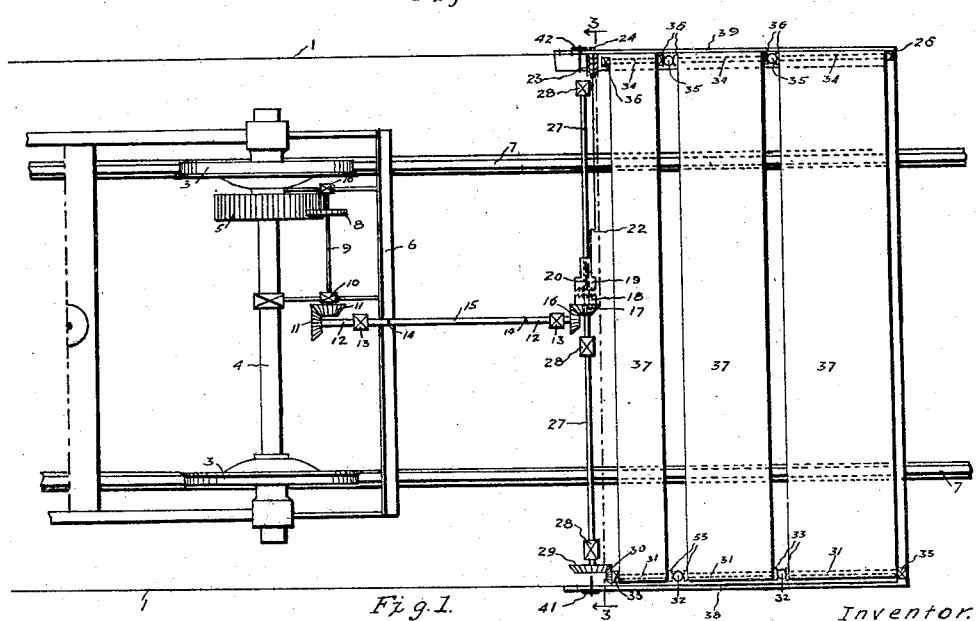

UNITED STATES PATENT OFFICE.

FRANK J. PLUMMER, OF PORTLAND, MAINE.

CAR-FENDER.

1,212,103. Specification of Letters Patent. Patented Jan. 9, 1917.

Application filed May 26, 1916. Serial No. 99,986.

*To all whom it may concern:*

Be it known that I, FRANK J. PLUMMER, a citizen of the United States, residing at Portland, in the county of Cumberland and State of Maine, have invented a new and useful Car-Fender, of which the following is a specification.

My invention relates to revolving car fenders for electric cars as well as for steam railroad freight and passenger cars. In the case of electric cars, as soon as a body strikes the car fender, certain rolls, belting or netting are automatically set to revolving and the body is thrown clear of the car and of the track. The rolls are set into operation either automatically, as soon as the body strikes them, or by the motorman through a bell crank lever, and with power taken either from the wheel axles or from an independent motor. In the case of steam railroad cars, the revolving fenders are in continuous operation only when car is moving forward. I attain these results by the mechanism illustrated in the accompanying drawings, in which—

Figure 1 is a general plan of an electric car, fender and gearing and front of the car truck, with the floor of the car removed; Fig. 2, a side elevation of the same, with a portion of the car wheel and fender bracket broken away to show the gearing; Fig. 3, a section of the main fender shaft on the line 3 3, Fig. 1; Fig. 4, a section through the automatic spring, a part of the push rod, fender bracket and sliding angle bar on the line 4 4, Fig. 3; Fig. 5, a general plan of the ordinary steam freight car with revolving fender; Fig. 6, a vertical section, longitudinal, of the steam car through the center; and Fig. 7, a section of the roller ratchet 45.

Similar numerals refer to similar parts throughout the several views.

The following are certain parts of the usual car: body 1, bumper 2, wheels 3, axle 4, main gear of electric car 5, end frame of truck 6, and rails 7.

Parts numbered 8 to 22 inclusive are various parts for taking power from the car axle of an electric car to operate the revolving fender; parts numbered 23 to 42, various mechanisms connected with the automatic revolving fender of the electric car; and parts numbered 43 to 54, mechanisms for the revolving fender of the steam railroad car.

Spur gear 8 meshes with main car gear 5, transmitting power, when car is running, through shaft 9, supported by bearings 10, through miter gears 11 to a stub driving shaft 12. The steel stub driving shafts 12 12 are supported by bearings 13 13, and are connected through couplings 14 14 to the heavy flexible driving shaft 15. This latter shaft 15, being flexible, allows the car to round curves, for on such occasions, the body of the car is at angle with the trucks. Driving bevel gear 16 meshes with its pinion 17 to which is securely attached ratchet jaw clutch 18. When car is in motion, parts numbered 8 to 18 inclusive are operative, the balance of the mechanism being dead.

Ratchet jaw clutch 19, with feather key 20, can be thrown into mesh with clutch 18, by the motorman through bell crank 21, or thrown into mesh through push rod 22, operated from automatic spring 23, held in place by automatic spring bolt 24, passing through sliding bar 25, said sliding angle bar 25, being pivoted at 26.

Main fender shaft 27 is continuous from side to side of car, with pinion 17 and ratchet jaw clutch 18 running idle on it. When ratchet clutch 19, sliding on shaft 27, with feather key 20, is thrown into mesh with clutch 18, main fender shaft 27, supported by bearings 28, is caused to revolve. Bevel gear 29 then revolves and through its pinion 30, causes fender driving shaft 31 to likewise revolve.

Fender driving shaft 31 is operated through universal joints 32, supported by bearings 33, which are attached to fender bracket 38.

Fender driven shaft 34 revolves through universal joints 35, supported by bearings 36, which are attached to sliding angle bar 25. This angle bar 25 rests and slides on left fender bracket 39, the two being pivoted at the lower end at 26.

Fender rolls, belting or netting 37 are continuous around fender shafting 31 and 34. Stationary screen 40 protects the main fender shaft and gearing.

Whenever it is desired to fold fender for parking purposes, it can be done on hinges 41 and 42 on fender brackets 38 and 39 respectively. In such cases, pinion 30 will revolve on its corresponding gear 29.

In the case of the electric car, the operation is as follows: When a body strikes the fender rolls 37, automatic spring 23 is stretched, allowing angle bar 25 to slide inward, causing push rod 22 to move inward also, which engages ratchet jaw clutch 19 to mesh with ratchet clutch 18, causing the fender rolls to revolve and throw the body clear of the car and of the track. Or the motorman can cause the rolls to revolve by stepping down on bell crank 21.

In the case of the steam railroad car, spiral gears 43 and 44 take power from car axle 4 and transmit through roller ratchet 45 to flexible driving shaft 46, supported by journals 47. As shown in Fig. 7, roller ratchet 45 will cause shaft 46 to revolve when car is going forward, but said shaft 46 will be dead when car is backing up.

From flexible shaft 46, power is transmitted to main spiral gear 48, thence to the two corresponding spiral gear pinions 49, attached to driving rollers 50. Driven rollers 51 are supported by brace rods 52 and journal supports 53. Revolving belts 54 are continuous around rollers 50 and 51, and these belts are continuously revolving when car has forward motion. They also have an outside revolving direction, and when a body strikes them, will pass the body to the outside, clear of the car, wheels and track.

I claim:

1. A fender of the character described composed of a frame, transversely-movable belts carried by said frame, mechanism for driving said belts, and means for connecting and disconnecting said mechanism, substantially as described.

2. In a fender, movable means for removing an obstruction from the fender path, normally-disconnected mechanism for driving said movable means, and automatic means for connecting said mechanism when an obstruction is encountered, substantially as described.

3. The combination with a vehicle, of a fender therefor including movable belts, normally-disconnected mechanism for actuating said belts, and automatic clutch means for coupling said mechanism to drive the belts when the fender encounters an obstruction, substantially as described.

4. The combination with a vehicle, of a fender therefor including side frame members hinged to fold, transversely-movable belts carried by said frame members, normally-disconnected mechanism for driving said belts, a clutch for coupling said mechanism, operator-controlled means for throwing said clutch, and automatic means also for throwing said clutch, substantially as described.

5. The combination with a vehicle, of a fender therefor comprising frame members, a plurality of transversely-movable belts supported in said frame members, belt shafts, a drive shaft in operative engagement with said belt shafts, mechanism for rotating the drive shaft when the vehicle is in motion, a clutch normally disconnecting said drive shaft from said mechanism, automatic means for engaging said clutch whenever an obstacle strikes the fender, and operator-controlled means for throwing said clutch independent of said automatic means, substantially as described.

FRANK J. PLUMMER.

Copies of this patent may be obtained for five cents each, by addressing the "Commissioner of Patents, Washington, D. C."